(12) United States Patent
Kumar

(10) Patent No.: US 12,218,837 B2
(45) Date of Patent: Feb. 4, 2025

(54) SYSTEMS FOR AND METHODS OF NETWORK TELEMETRY USING A REPURPOSED FIELD

(71) Applicant: Avago Technologies International Sales Pte. Limited, Singapore (SG)

(72) Inventor: Vivek Kumar, Bangalore (IN)

(73) Assignee: Avago Technologies International Sales Pte. Limited, Singapore (SG)

( * ) Notice: Subject to any disclaimer, the term of this patent is extended or adjusted under 35 U.S.C. 154(b) by 343 days.

(21) Appl. No.: 17/698,293

(22) Filed: Mar. 18, 2022

(65) Prior Publication Data

US 2023/0239240 A1  Jul. 27, 2023

(30) Foreign Application Priority Data

Jan. 21, 2022 (IN) .............................. 202241003510
Jan. 27, 2022 (IN) .............................. 202241004448

(51) Int. Cl.
*H04L 45/74* (2022.01)

(52) U.S. Cl.
CPC .................................. *H04L 45/74* (2013.01)

(58) Field of Classification Search
CPC ....................................................... H04L 45/74
See application file for complete search history.

(56) References Cited

U.S. PATENT DOCUMENTS

| 8,953,600 | B2* | 2/2015 | Groves, Jr. ............. | H04L 43/04 |
| | | | | 370/392 |
| 11,463,905 | B2* | 10/2022 | Song ..................... | H04L 43/04 |
| 11,716,273 | B2* | 8/2023 | Song ..................... | H04L 69/22 |
| | | | | 370/241 |
| 11,924,681 | B2* | 3/2024 | Song ..................... | H04L 43/04 |
| 2014/0079057 | A1* | 3/2014 | Groves, Jr. ............. | H04L 43/04 |
| | | | | 370/392 |
| 2019/0098118 | A1* | 3/2019 | Utama ................ | H04L 61/4511 |
| 2020/0412633 | A1* | 12/2020 | Song ..................... | H04L 43/10 |
| 2021/0084530 | A1* | 3/2021 | Song ..................... | H04L 69/22 |
| 2023/0017175 | A1* | 1/2023 | Song ..................... | H04L 69/22 |

FOREIGN PATENT DOCUMENTS

| CN | 113196705 A | * | 7/2021 | ............. H04L 41/12 |
| CN | 114128231 A | * | 3/2022 | ........... H04L 43/024 |
| EP | 3850792 B1 | * | 12/2023 | ............. H04L 41/12 |

(Continued)

OTHER PUBLICATIONS

Touch, J., Updated Specification of the IPV4 ID Field, Nov. 27, 2012, The Internet Engineering Task Force (IETF), draft-ietf-intarea-ipv4-id-update-07.txt, https://datatracker.ietf.org/doc/html/draft-ietf-intarea-ipv4-id-update-07 (Year: 2012).*

(Continued)

*Primary Examiner* — Eric Nowlin
(74) *Attorney, Agent, or Firm* — Foley & Lardner LLP

(57) ABSTRACT

A network device includes at least one port and a processor for use in a network for communicating a packet. The processor is configured to obtain a packet header for a packet and perform telemetry using postcard and/or passport approaches. The processor uses a repurposed field in the packet header to indicate telemetry is to be performed on the packet.

20 Claims, 5 Drawing Sheets

(56) References Cited

FOREIGN PATENT DOCUMENTS

| EP | 4346178 A2 * | 4/2024 | |
|---|---|---|---|
| WO | WO-2014042966 A1 * | 3/2014 | ............. H04L 43/04 |
| WO | WO-2019067665 A1 * | 4/2019 | .......... H04L 61/1511 |
| WO | WO-2020263259 A1 * | 12/2020 | ............. H04L 41/12 |
| WO | WO-2021050083 A1 * | 3/2021 | ........... H04L 43/024 |

OTHER PUBLICATIONS

Kumar et al., Inband Flow Analyzer, Apr. 24, 2020, The Internet Engineering Task Force (IETF), draft-kumar-ippm-ifa-02, https://datatracker.ietf.org/doc/html/draft-kumar-ippm-ifa-02 (Year: 2020).*

Song et al., In-Situ OAM Marking-based Direct Export, Nov. 15, 2021, The Internet Engineering Task Force (IETF), draft-song-ippm-postcard-based-telemetry-11, https://datatracker.ietf.org/doc/draft-song-ippm-postcard-based-telemetry/ (Year: 2021).*

Request for Comment (RFC) 2460, Internet Protocol, Version 6 (IPV6) Specification, Dec. 1998, The Internet Engineering Task Force (IETF), https://datatracker.ietf.org/doc/html/rfc2460 (Year: 1998).*

"RFC6864." Document Search and Retrieval Page, https://datatracker.ietf.org/doc/html/rfc6864.

"Updated Specification of the IPV4 ID Field." Document Search and Retrieval Page, https://datatracker.ietf.org/doc/html/rfc6864.

Deering, Stephen E., and Robert M. Hinden "Internet Protocol, Version 6 (IPv6) Specification." Document Search and Retrieval Page, https://datatracker.ietf.org/doc/html/rfc8200.

Gont, et al. "Generation of IPv6 Atomic Fragments Considered Harmful." Document Search and Retrieval Page, https://datatracker.ietf.org/doc/html/rfc8021.

Kumar, J, et al. "Inband Flow Analyzer Draft-Kumar-IPPM-IFA-03." Document Search and Retrieval Page, https://datatracker.ietf.org/doc/html/draft-kumar-ippm-ifa-03.

Song, Haoyu, et al. "In-Situ OAM Marking-Based Direct Export." Draft-Song-IPPM-Postcard-Based-Telemetry-11—in-Situ OAM Marking-Based Direct Export, https://datatracker.ietf.org/doc/draft-song-ippm-postcard-based-telemetry/.

* cited by examiner

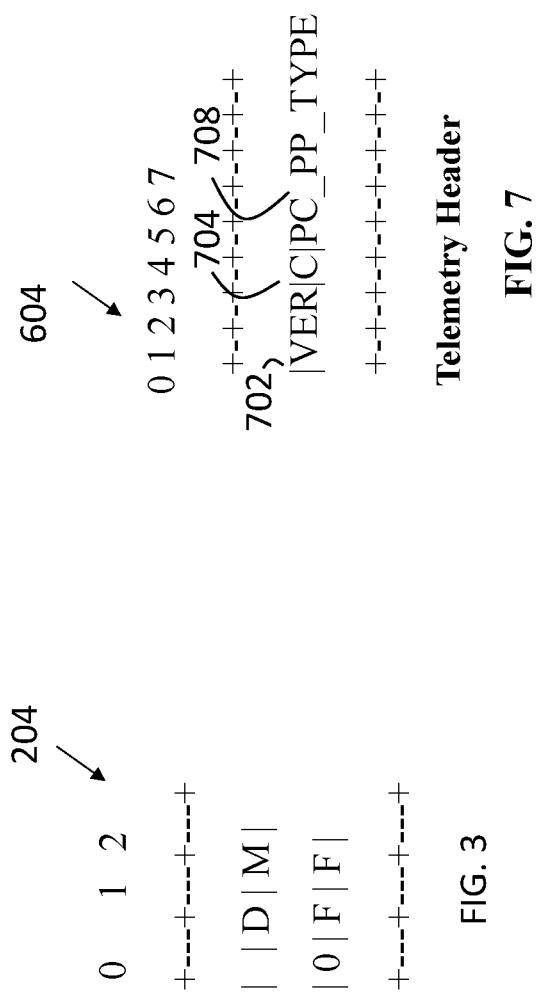

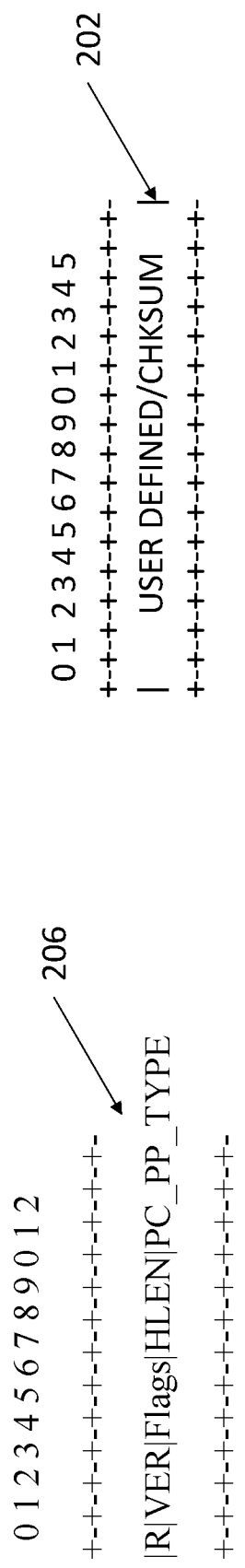
FIG. 5 Telemetry Extension Header (TH)
FIG. 4 Telemetry Header (TH)

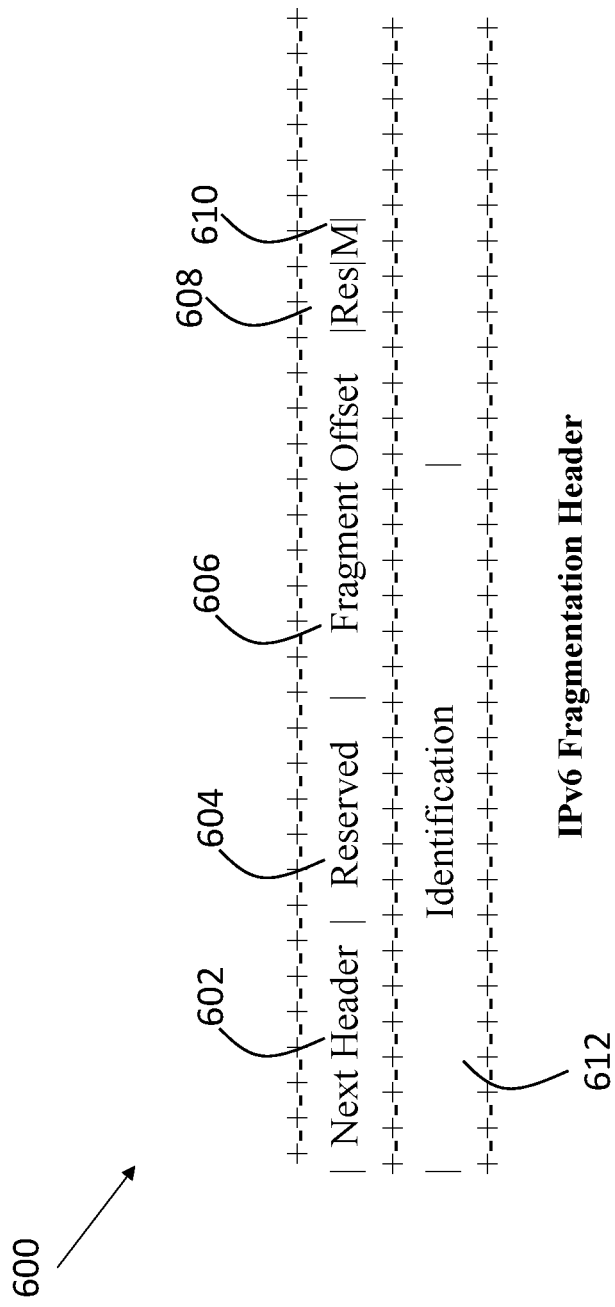

SYSTEMS FOR AND METHODS OF NETWORK TELEMETRY USING A REPURPOSED FIELD

CROSS-REFERENCE TO RELATED PATENT APPLICATIONS

This application claims the benefit of and priority to Indian Patent Application No. 202241004448, filed on Jan. 27, 2022 and Indian Patent Application No. 202241003510, filed Jan. 21, 2022. The above-referenced applications are incorporated by reference herein in their entireties.

FIELD OF THE DISCLOSURE

This disclosure generally relates to systems and methods for communicating data in a network environment, and, more specifically, the disclosure relates to systems for and methods of processing and/or communicating telemetry data.

BACKGROUND OF THE DISCLOSURE

The communications industry is rapidly changing to adjust to emerging technologies and ever increasing customer demand. Demands for new network applications and higher performance is requiring communication networks to operate at faster speeds (e.g., higher bandwidth). Many communication providers are using packet switching technology to achieve these goals. Storage, communications, entertainment, and computer systems utilize network devices such as switches (e.g., routers, packet switching systems, and other network data processing devices) to communicate packets, frames or other data units.

Switches are hardware components of networks which control the distribution of messages or data packets, frames or other data units based on address information contained within each data packet. The term data packet as used herein is not limited to a specific protocol or format of data unit or frame.

Communication providers use telemetry to record metadata for a specific communication flow associated with the switches or data packets. Communication providers use the metadata to help accelerate network troubleshooting, anticipate network capacity growth, measure baseline network performance, and/or identify sources of issues emerging on the network.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 3 is an illustration of a flag field for a packet communicated in the network illustrated in FIG. 1 according to some embodiments.

FIG. 4 is an illustration of a repurposed field as a telemetry header for a packet communicated in the network illustrated in FIG. 1 according to some embodiments.

FIG. 5 is an illustration of repurposed field as a telemetry extension header for a packet communicated in the network illustrated in FIG. 1 according to some embodiments.

FIG. 6 is an illustration of a fragmentation header for a packet communicated in the network illustrated in FIG. 1 according to some embodiments.

FIG. 7 is an illustration of a repurposed field as telemetry header for a packet communicated in the network illustrated in FIG. 1 according to some embodiments.

Figure 1:
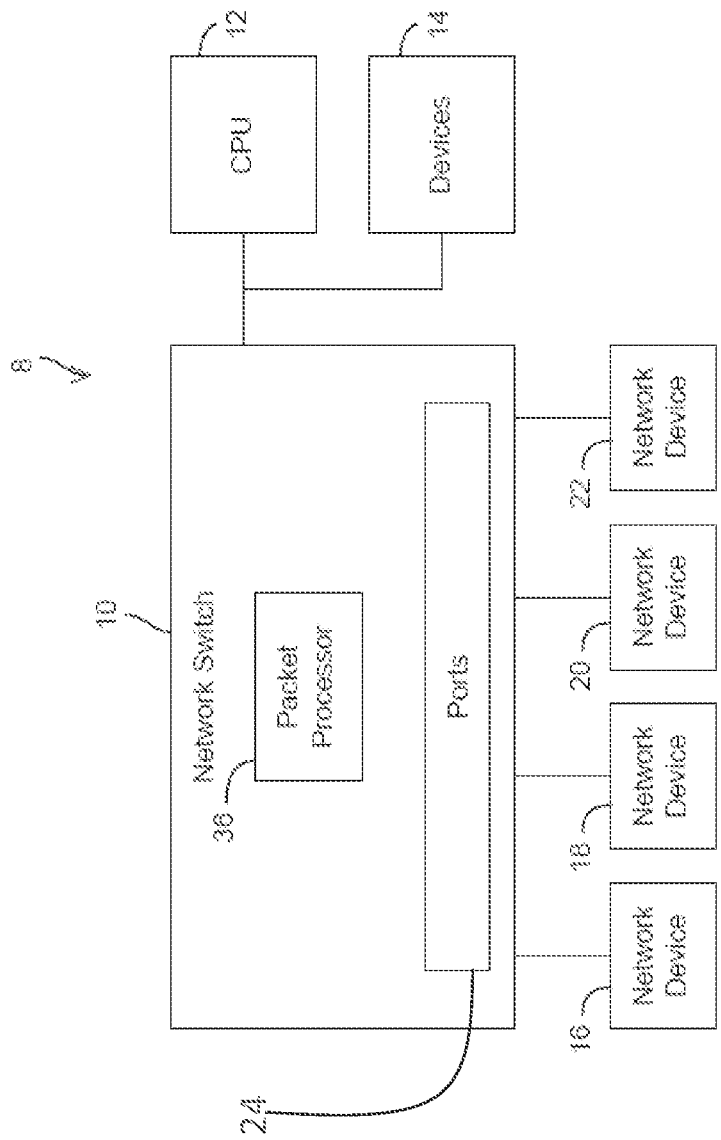
FIG. 1 is a general block diagram depicting a network device within a network according to some embodiments.

The details of various embodiments of the methods and systems are set forth in the accompanying drawings and the description below.

DETAILED DESCRIPTION

Systems and methods of some embodiments herein use telemetry to record metadata for a specific communication flow without altering the packet flow. In some embodiments, the systems and methods are agnostic to any telemetry protocol such as in band flow analysis (IFA) 2.0, in situ operations, administration, and maintenance (IOAM) or postcard based telemetry (PBT). In some embodiments, the systems and methods provide probe or in band telemetry for postcard and/or passport approaches using a reconfigured or repurposed header without compromising on forwarding behavior in presence of nodes which cannot process the reconfigured or repurposed header. In some embodiments, the systems and methods provide probe or in band telemetry for postcard and/or passport approaches without a disrupting the communication stream. The systems and methods can be used in Internet Protocol (IP)v4 and IPv6 communication protocols as well as other communication schemes.

In some embodiments, an atomic fragmentation header approach provides seamless forwarding of telemetry packet in a network when a node does not understand a telemetry shim (e.g., IFA2.0/IOAM/PBT). The transit node processes a set of five different values that comprise a Transmission Control Protocol/Internet Protocol (TCP/IP) connection (e.g., a 5 tuple) of a flow in same fashion for packet with an atomic fragmentation header and without atomic fragmentation header because the Layer 4 information is always present after the fragmentation header in some embodiments. In some embodiments, the atomic fragmentation header indicates presence of telemetry information so that a node that does not support telemetry continues to forward the packet in same fashion (e.g., hashing) as it would have done for a packet without telemetry.

Disadvantages associated with conventional schemes that use one shim header after an IPv6 header (e.g., IFA2.0 or operation, administration, and maintenance (IOAM)) or a field in an existing IPv6 header (e.g., Traffic Class (e. g., PBT)) are avoided in some embodiments. For example, a packet without the shim header following the same path as the packet with the shim header is not always guaranteed. In IFA2.0 or PBT, the IP_PROTOCOL field is used to indicate the presence of additional shim header which carries information on what kind of metadata capture needs to be performed. By updating the IP_PROTOCOL field, the 5 tuple (e.g., Src IP address, Dst IP address, IP Protocol, Src L4 Port and Dst L4 Port) of the flow is changed for these packets, and these packets can follow different paths compared to packets without this extra shim header if it encounters nodes in network which do not recognize how to process these new shim headers. Accordingly, in some embodiments, systems and methods do not use a shim header after an IPv6 header or update the IP protocol field to indicate types of metadata capture.

The PBT approach of using some bits of the Differentiated Services Code Point (DSCP) field—a 6-bit field used to identify the level of service a packet receives in the network—to indicate that this packet is marked as using the postcard approach (i.e. sending metadata to a collector for this packet) may not work when the packet traverses through the node which does not understand the overloading of DSCP bits for PBT using packet marking or PBT-M. The node can re-write the DSCP field and unintentionally unmark the telemetry encoding. If the packet that is carrying telemetry encoding follows different path than non-telemetry packet or the telemetry encoding is unmarked unintentionally, the telemetry does not provide accurate metadata or interferes with the communication stream. Accordingly, in some embodiments, systems and methods do not use the DSCP field to indicate types of metadata capture.

In some embodiments, probe telemetry is provided where a clone of live packet is used to track the metadata. Variations for in band or in situ based telemetry are also provided. In some embodiments, a field below the IPv4 header has 3 fields which are only used when the payload inside IP header is carrying fragmented data. Since telemetry requirement does not mandate support for telemetry for fragmented packet, fields below the field of IPv4 header are used for telemetry in some embodiments. These fields that are related to fragment in IPv4 header are not used for decide forwarding behavior so using these field for telemetry purpose does not alter packet forwarding behavior.

Some embodiments relate to a network device. The network device includes at least one port, and a processor configured to provide telemetry using postcard and/or passport approaches. The processor provides post card type information or passport type in formation in a field used in fragmentation.

In some embodiments, the processor operates according to an IPv4 or IPv6 communication schemes. In some embodiments, the network device the field is a fragmentation offset field. In some embodiments, the field is in a fragmentation header and is a reserve field.

In some embodiments, the telemetry is probe or in-band telemetry. In-line or inband telemetry is a framework designed to allow the collection and reporting of network state, by the data plane, without requiring intervention or work by the control plane in collecting and delivering the state from the data plane. In band or inline telemetry stamps or captures telemetry information in live data packets communicated through the network. In probe telemetry, a clone of live data packets are made (a clone can be through sampling of live packet), and telemetry information is stamped on this probe (clone) data packet. In some embodiments, a telemetry extension header information is provided in an identification field. In some embodiments, the field includes a fragmentation offset field and a no fragmentation bit is set in a flag field.

Some embodiments relate to a method of performing telemetry in a network for communicating packets. The method includes obtaining a packet header, and repurposing at least one field in the packet header to indicate telemetry is to be performed on the packet. The telemetry is defined by telemetry information in a field or header used for fragmentation information prior to repurposing.

In some embodiments, the packet header is an IPv4 or IPv6 header. In some embodiments, the field includes a fragmentation offset field. In some embodiments, repurposing includes providing a nonzero value in a fragmentation offset field and setting a flag to indicate do not fragment.

In some embodiments, the at least one field is in a fragmentation header in the packet header. In some embodiments, the at least one field is reserve field in a fragmentation header. In some embodiments, the at least one field includes pass port type or post card type information. In some embodiments, the at least one field includes the pass port type or post card type information that indicates the presence of IFA2.0 shim after a UDP/TCP header.

Some embodiments relate to a processor for use in a network for communicating a packet. The processor is configured to obtain a packet header for a packet and perform telemetry using postcard and/or passport approaches. The processor uses a repurposed field in the packet header to indicate telemetry is to be performed on the packet.

With reference to FIG. 1, an exemplary configuration of a network 8 includes a network device 10. The network device 10 may be a hardware-based and/or software-based device such as a network switch for moving data packets in network 8 according to address information contained within the packet itself. In some embodiments, the network device 10 may additionally and/or alternatively perform the function of a router and be configured to move packets in and across networks, or in general be any other device configured to move data in or across networks. In addition, although the disclosure may refer at times to a "switch" and "switching," for the purposes of this description, the terms "switch" and "switching" may include both switching and routing. The network device 10 is a security switch in some embodiments.

The network device 10 is a network switch functionally connected to a central processing unit (CPU) 12 and other external devices 14 in some embodiments. External devices 14 may be other external processors, external memory, other network devices such as servers, routers, or computers, and/or other network switches, access points and routers to expand the switching capability. CPU 12 can be used to program the network device 10 based on desired rules or protocols for packet processing. CPU 12 can also be used for flow analysis and to receive metadata for such analysis.

Data received from network device(s) 16, 18, 20, and 22 at ports 24 can be processed by network device 10 independent of CPU 12 based on the programmed instructions. The processed data is redistributed across the ports 24 to the appropriate network device(s) 16, 18, 20, and 22 based on the programmed packet processing rules. The network device 10 can be an integrated, modular, single chip solution. In some embodiments, network device 10 includes an application-specific integrated circuit (ASIC) constructed according to the packet processing rules, a field programmable gate array (FPGA), a communications processor, or any other type and form of dedicated silicon logic or processing circuitry capable of processing and switching packets or other data units. Additionally and/or alternatively, network device 10 can be or include a number of individual components on a circuit board, or implemented on a general purpose device, or general purpose devices configured using software.

While the word "packet" is used, it should be understood that the disclosed process can work with other types of data including cells, frames, datagrams, bridge protocol data unit packets, packet data, etc. Hence, as used herein, the term "packet" includes (without limitation) cells, frames, datagrams, bridge protocol data unit packets, packet data, etc. Packet processing can include reading, modifying, and classifying the packet, changing the packet forwarding behavior, removing and/or appending information to the packet, mirroring the packet to another port, storing the packet in a buffer, reordering the packet in a series of packets, sending the packet to a service queue, recirculating or looping back a packet, or changing the type of packet. For example, network device 10 can replicate the packet and choose a specific port of ports 24 as the egress port, which can thereafter forward the packet to network device 10 or other devices 16, 18, 20, and 22 or other networks. The egress port and final network device destination are determined by data contained in the packet. Forwarding a packet can involve switching the packet within network 8 to one or more egress ports (e.g., of ports 24) of the network device 10. In forwarding, a packet can be replicated and sent to multiple destinations on a single egress port or across multiple egress ports. In some embodiments, the final packet destination is a successive network device, and the packet is forwarded from network device 10 through a series of network devices before the final destination is reached.

The packet contains information for replicating and forwarding the packet to the appropriate destinations on the network. A packet is originally received on a source port noted by network device 10 and it can then be replicated and forwarded to the same or one or more other ports that belong to the multicast group indicated by the information contained in the packet. In multicast, packets tagged as belonging to a multicast group are sent to subscribed destinations that have indicated to network device 10 that they belong to the multicast group. The single packet can be replicated and forwarded to a plurality of destinations without flooding the network, such that only a single packet is transmitted to each destination.

Network device 10 includes a packet processor 36, and ports 24. Processor 36 is any type of circuit, module, or device configured for packet processing. Packet processor 36 provides addressing decisions and processing for network device 10. Advantageously, processor 36 implements systems and methods described herein for processing telemetry data. In some embodiments, processor 36 supports at least a passport (PP) approach and/or a post card (PC) approach to record flow specific metadata in switches and routers such as devices 10, 16, 18, 20, 22. Processor 36 is implemented as a hardware engine, an ASIC constructed according to the packet processing rules, a field programmable gate array (FPGA) or logic device, a communications processor, or any other type and form of dedicated semiconductor logic or processing circuitry capable of processing or supporting telemetry data.

In some embodiments, the networks device 10 reconfigures or repurposes a header of the packet for telemetry such that appropriate PP and PC approaches are performed while still allowing the packet to be processed by legacy switches that do not recognize the telemetry implications of the reconfigured headers. Processor 36 repurposes at least one field in a fragmentation header or a field for a fragmentation offset to provide telemetry information when processor 36 determines telemetry is to be performed on the packet in some embodiments. Processor 36 can receive the decision that telemetry is to be performed from an external source or as the result of programming or other algorithm and repurpose the field accordingly in some embodiments.

In a PP approach, based on some indication in packet, the metadata for every node which the packet traverses is stacked in same packet and at the terminating node the full stack of metadata is sent to an analyzer (e.g., collector) for flow specific analysis. In PC approach, based on some indication in packet, every node records its metadata and sends to an analyzer (e.g., collector) a copy of original packet along with metadata for flow specific analysis.

In both the PP and PC approaches, the capture of the metadata can be triggered on a live data packet (in band or in situ) or on a probe packet (clone of live packet). The probe packet is generally a test packet and does not need to adhere to the restrictions imposed by the Request for Comment (RFC) 6864 document. Since the initiator node clones the packet, it is generally considered a source of this packet and has complete freedom to encode an identification field. Also this packet is dropped at telemetry termination node so it will not reach the host destination and will not interfere with the stream.

The node (e.g., devices 10, 16, 18, 20, or 22) which wants to initiate telemetry recording for an IPv4 packet checks if the flag bits are not indicating that the packet is a fragmented or to be fragmented packet (First, Middle or Last) in some embodiments. An atomic fragment packet also qualifies for probe generation using this solution in some embodiments. Only when the packet is an un-fragmented packet (includes atomic fragment), the identification and fragment offset field of IPv4 header is repurposed for telemetry purposes for probe packets as described below.

Figure 2:
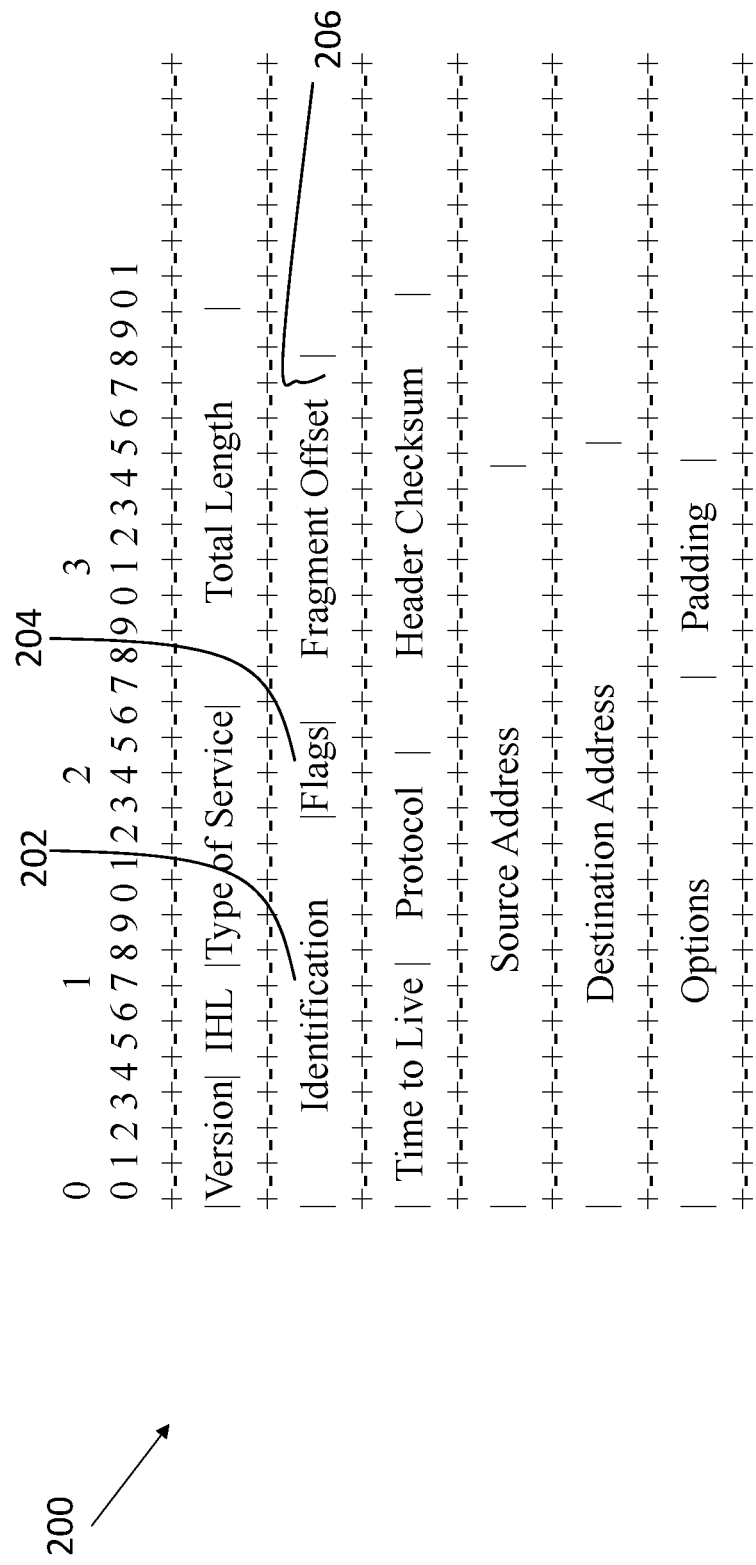
FIG. 2 is an illustration of a header for a packet communicated in the network illustrated in FIG. 1 according to some embodiments.

With reference to FIG. 2, an IPv4 header 200 includes a 16 bit identification field 202, a 3 bit flag field 204, and a 13 bit offset field 206. Although specific bit lengths are mentioned, other bit lengths can be utilized depending on protocol, and system criteria. The 16 bit identification field 202, the 3 bit flag filed 204, and the 13 bit offset field 206 are related to fragmentation. The 16 bit identification field 202 stores an identifying value assigned by the sender to aid in assembling the fragments of a datagram.

With reference to FIG. 3, the 3 bit flag field 204 indicates control flags. Bit 0 of field 204 is reserved and must be zero. Bit 1 of field 204 indicates the packet maybe fragmented when zero and the packet should not be fragmented when one. Bit 2 of field 204 indicates the packet is the last fragment when zero and the packet has more fragments if bit 2 is 1. The 13 bit offset field 206 indicates where in the datagram the fragment belongs. The fragment offset is measured in units of 8 octets (64 bits). The first fragment has an offset value of zero.

With reference to FIG. 4, the 13 bits of fragment offset field 206 is re-purposed as a Telemetry Header (TH) by network device 10 (FIG. 1) in some embodiments. Bit 0 is a 1 bit reserved field and is used to make sure that fragment offset value should never be 0 in some embodiments. Bits 1 and 2 are version bits. Version bits can be set to 0. Bits 3-5 of field 206 are flag bits that can indicate a specific usage such as PP or PC mode and provide a checksum. Bit 3 indicates a PC mode at a value of 0, and a PP mode at a value of 1. Bit 4 indicates a checksum is not present at a value of 0 and a checksum is present at a value of 1. Bit 5 is reserved for future features. Bit 6 is a one bit field indicating a header length (HLEN) where a value of 0 indicates only a fragment offset is overlaid and a value of 1 indicates a fragment offset and identification field of the IPv4 header are both enabled. Bits 7-12 (PC_PP Type) indicate a type of PC or PP telemetry. Bits 7-12 can contain user defined encoding on what kind of telemetry shim is present after the header mentioned in the IP_PROTOCOL field of a IPv4 packet. A user can use any non-zero value to indicate the presence of shim type for telemetry like IFA2.0 or PC with shim etc.

With reference to FIG. 5, in some embodiments, the format of 16 bit identification field 202 is repurposed as a Telemetry Extension Header (TH). Identification filed 202 is a 16 bit user defined/checksum field in some embodiments. Field 202 is decoded based on the version bits of field 206 (bits 1 and 2 in FIG. 4), the flags bits of field 206 (bits 3-5 in FIG. 4), and bits 7-12 of field 206 (FIG. 4). In probe flows, where a clone of a live packet is generated, field 202 is used as a 16 bit checksum on the re-purposed Telemetry Header (e.g., field 206 in FIG. 4) to prevent any false matching in some embodiments. Field 202 is used only for probe flows in some embodiments.

In some embodiments, if the packet is carrying any IFA2.0 shims to indicate recording of metadata on nodes, the newly defined re-purposed telemetry header field (e.g., field 206 in FIG. 4, "PP_PC_TYPE" (Bits 7-12)) indicates the presence of IFA2.0 shim after UDP/TCP header and does not alter the IPv4 IP_PROTCOL field, thereby making sure that the 5 tuple used in hashing remains the same for packets with IFA2.0 shim and without IFA2.0 shim. For example:
  Packet without IFA2.0/PBT shim: L2_HDR→IP_HDR→UDP/TCP→Payload—Here IP_HDR.IP_PROTOCOL has UDP/TCP protocol as a value.
  Packet with IFA2.0/PBT shim using proposed Telemetry Header: L2 HDR→IP_HDR→UDP/TCP→IFA2.0/PBT-Shim→Metadata→Payload. Here, IP_HDR.IP_PROTOCOL also has a UDP/TCP protocol as a value.

The presence of IFA2.0/PBT-shim protocol is indicated via "PP_PC_TYPE" and "Flags" field in field 206 (Telemetry Header), and hence, the 5 tuple value for hash calculation is not changed and the position of TCP/UDP header is not changed. If this packet traverses a node which does not understand field 206 as a repurposed Telemetry Header in IPv4, the node can still continue to hash and forward the packet seamlessly according to some embodiments. Since the field 202 (identification field in FIG. 2) is not used in hashing by transit nodes, even if this packet traverses through a node which does not recognize the field 206 as the re-purposed Telemetry Header, field 202 will not have any adverse impact on packet flow in some embodiments.

In some embodiments, DSCP bits are not used to indicate PC marking. The "PP_PC_TYPE" and "Flags" bits of field 206 of the re-purposed telemetry header indicate it is a PC marked copy. Any node which is not aware of this re-purposed Telemetry Header ignores this field and hence intentionally unmarking the PC indication is prevented. Since this field is overlaid on field 206 (fragment offset) and field 202 (identification field) which no nodes modify, the unwanted unmarking is avoided in some embodiments.

In some embodiments, using field 206 (fragmentation offset as non-zero) when there is no fragmentation and setting bit 1 of field 204 (DF (Do not fragment flag)) results in no chance of false match as packets with bit 1 of filed 204 set as 1 do not have a non-zero fragmentation offset in some embodiments. As an additional check, for probe based telemetry, field 206 (16 bit checksum) is overlaid on identification field 202 of IPv4 header as discussed above in some embodiments.

In some embodiments, during probe telemetry initiation, the node can decide to enable PP based telemetry for certain flows based on local configuration. The node checks that the incoming IPv4 packet is non fragmented (e.g., no flag bits set in field 202 and field 206 (fragment offset) is 0) or atomic fragmented (e.g., DF=1 and fragment offset as 0) and clones one out of N packet for PP based telemetry using the newly defined fields to mark the packet for PP tracking through sampling and clone techniques by the node. The node truncates the cloned packet to 256 or 512 bytes depending upon configuration so that the cloned packet is not subjected to fragmentation downstream of the node.

Once cloned and truncated, the following update is performed by the node in some embodiments:
  a) Set Ver field of field 206 (Telemetry Header) as 0
  b) Set Flags field (bit 1 of field 206) as Passport (value 1).
  c) Set DF (do not fragment) bit of IPv4 header as 1 (e.g., prevents any node downstream from fragmenting this packet which can lead to unspecified behavior).
  d) Set PC_PP_TYPE of field 206 to desired value to indicate type of PP shim present after L4 (TCP/UDP) header. The type of shim can be IFA2.0 or any other shim.
  e) Set Checksum bit in flag bits of field 206 as 1.
  f) All other bits are 0 in field 206 (Telemetry Header).
  g) Calculate checksum on all fields of Telemetry Header and update the identification field with that value. Use checksum algorithm (same as used for IP header checksum).

The node can also compute incremental IP checksum since it has modified the fields of IPv4 header.

During probe telemetry transit, the node enabled for PP data recording decodes the newly re-purposed header (field 206) when the IPv4 header Flags bits (bits 3-5 of field 206) indicate no fragmentation and only DF bit (bit 3 of field 204) is 1 and the frag offset in field 206 is non-zero. Based on decoding of PC_PP_TYPE and Flags field in the Telemetry Header (field 206), the node determines whether the packet is PC, PP or none. Before triggering any metadata collection, the transit node should validate that the packet is with frag offset non-zero and DF flag is set as 1. If checksum flag is set in field 206 (Telemetry Header), then the node should have validated earlier. In case of a checksum mismatch, the node ignores all fields in Telemetry Header and continues processing this packet as a normal IPv4 packet.

Since the initiator node is marking IPv4 Flags bits (bits 3-5 of field 206) as DF with the fragment offset as a non-zero in field 206, this packet is not to be treated as last fragment or atomic fragment by a downstream node which prevents any miss forwarding due to the field 206 being a re-purposed Telemetry Header in some embodiments. The transit node should not update any fields of Telemetry Header.

In some embodiments, during probe telemetry termination, the node enabled for terminating the PC processes all checks as listed in the transit flow. Once the packet passes through these checks, the terminating node records the node metadata and sends this packet to the collector. Since this is probe packet, this packet is not forwarded to the downstream node.

In some embodiments, during in band telemetry detection, the RFC 6864 document prohibits usage of field 202 which is set by the source of the IP packet to support seamless in band telemetry for PC and PP approaches so the node is configured to use only field 206 (fragment offset) to detect whether to do the PC or PP approach (e.g., use only Telemetry Header as defined in FIG. 4 with H_LEN as 0 and C flag as 0).

In some embodiments, during in band telemetry initiation, IFA2.0 in band telemetry is taken as an example for flow walkthrough based on local configuration, and the node can decide to enable IFA2.0 based telemetry for certain flows. The node checks that the incoming IPv4 packet has no flags bits set. This approach does not support in band telemetry for any type of fragment packet (first, middle, last or atomic). The node performs the following exemplary update in a re-purposed telemetry in band header to indicate it is IFA2.0 for downstream node:

a) Set Ver field of Telemetry Header (field 206) as 0
b) Set Flags in field 206 as Passport (value 1).
c) Set DF (do not fragment) bit of IPv4 header as 1 in field 202. In some embodiments, this prevents any node downstream from fragmenting this packet, which can lead to unspecified behavior.
d) Set PC_PP_TYPE field in field 206 to desired value to indicate type of Passport shim present after L4 (TCP/UDP) header. The type of shim can be IFA2.0 or any other shim.
e) Set Checksum bit in field 206 in flag as 0.
f) All other fields as 0 in field 206 Telemetry Header.

The node also computes incremental IP checksum since it has modified the fields of IPv4 header in some embodiments.

In some embodiments during in band telemetry transit, the node decodes the newly re-purposed header (field 206) when the IPv4 header Flags bits indicate no fragmentation and only DF bit is 1 and frag offset as non-zero. Based on decoding of PC_PP_TYPE field and Flags field in Telemetry Header, the node will decide whether the packet is for the PP or PC approach or neither. Before triggering any PC based metadata collection, the transit node validates the fields present in Telemetry Header in some embodiments. Since the initiator node is marking IPv4 flags as DF (filed 204) with the fragment offset as non-zero (field 206), this packet is not treated as a last fragment or an atomic fragment by a downstream node, thereby preventing any miss forwarding due to the re-purposed telemetry header in some embodiments. The transit node does not update any fields of the telemetry header in some embodiments.

In some embodiments, during in band telemetry transit, the node enabled for terminating the PC processes all checks as listed in the transit flow. Once the packet passes through these checks, the terminating node records the node metadata and sends a copy of this packet to the collector. Since this is an in band packet, the terminating node performs the following before forwarding the in band packet to a downstream node in some embodiments:
a) Remove all the metadata stack from this packet (if any) along with shim header.
b) Reset all fields of this Telemetry In Band Header
c) IP Flags reset DF field to 0.
d) Recompute IP checksum and forward the packet The above discussed approaches can have many variation for future extensibility. In future versions of the telemetry header, at least one Jump Index (JI) field can be used to tell how many headers to skip to insert the telemetry shim of the telemetry protocol such as IFA2.0 etc. In some embodiments, the IFA2.0 or PBT shim is inserted after L4 header which is pointed by IP_PROTOCOL field of an IPv4/IPv6 header. In some embodiments, the user can decide to insert a telemetry shim like IFA2.0 or similar using the jump index (JI) field after a number of header stack entries of the header stack. This can be useful for scenarios where more than one header is after an IPv4/IPv6 header (like extension headers) in some embodiments.

In some embodiments, devices 10, 16, 18, 20, and 22 can be configured for seamless IPv6 telemetry using atomic fragmentation. The approach for IPv6 telemetry can be similar to the approaches discussed above with respect to seamless IPv4 telemetry using the PP and PC approach. In some embodiments, a probe version of telemetry is provided where a clone of a live packet is used to track the metadata. A variation of the probe version is provided for in band or in situ based telemetry as discussed below.

In some embodiments, an IPv6 fragment extension header is used as or repurposed as an extension header. The atomic fragmentation header can be used as the extension header in some embodiments. The header indicates the presence of extension header but there is no fragmentation in the packet. The transit node processes all 5 tuple of flow in the same fashion for packets with the atomic fragmentation header and without the atomic fragmentation header since the Layer 4 information is always there after the fragmentation header in some embodiments.

The RFC 8021 document limits the usage of this atomic header, but that limitation is true for an end system (host node) which processes this packet. In telemetry use case, the transit routers process this packet as non-fragmented without any issues in some embodiments. The probe packet, which is a clone of live packet, is like a test packet and does not need to adhere to the restrictions imposed by the RFC 8021 document. This packet is dropped at the telemetry termination node so it will not reach the host destination. The node initiating telemetry recording for IPv6 packet is configured to check if there is no fragmentation extension header present.

With reference to FIG. 6, exemplary fragmentation header 600 (e.g., per RFC 8200 document) includes a next header field 602, a reserved field 604, a fragment offset 606, a RES field 608, an M field 610 and an identification field 612 related to fragmentation for the fragmentation header. The next header field 602 is an 8-bit selector field that identifies the initial header of the type of the fragmentable part of the original packet. The next header field 602 uses the same value as the IPv4 Protocol field. The reserved field 604 is an 8-bit field that is initialized to zero for transmission and ignored on reception. The fragment offset field 606 is a 13-bit unsigned integer field. The offset indicates in 8-octet units the data following the header relative to the start of the fragmentable part of the original packet. The Res field 608 is a 2-bit reserved field that is initialized to zero for transmission and ignored on reception. The M flag field is a 1 bit field set to 1 to indicate more fragments and is 0 to indicate the last fragment. The identification is a 32 bit filed.

The reserved flags in field 604 of the IPv6 fragmentation header are ignored by nodes when processing this packet in some embodiments. In some embodiments, the reserved flags indicate the type of telemetry (PP or PC) and different formats of shim after Layer 4 (TCP/UDP) header. In FIG. 6, fragment offset 606 and M flag 610 will always be 0 and header 600 is treated as an atomic fragment header by all nodes which do not support this approach. Nodes can parse the Layer 4 information correctly even with the presence of header 600 and provide seamless forwarding. Any node in the network that does not support this new telemetry ignores these fields and processes the packet as a normal atomic fragment packet in some embodiments.

With reference to FIG. 7, the 8 bit reserved field 604 is re-purposed as a telemetry header in some embodiments. A 2 bit version field 702 is 1 for this technique. A 1 bit checksum field 704 is 0 if the identification field 612 in the fragmentation header 600 is not used as a checksum and is 1 if the identification field 612 in the fragmentation header is used as the checksum. In some embodiments, this checksum field 704 is used to ensure that no false hits occur. A 5 bit field 708 indicates a type of PP or PC telemetry.

Field 708 can contain user defined encoding on what kind of telemetry shim is present after the header mentioned in next header field 602 of IPv6 packet. The user can use any non-zero value to indicate the presence of shim type for telemetry like IFA2.0 or PC with shim, etc. Field 612 can be repurposed as a user defined/checksum field (e.g., 32 bits). The checksum of repurposed field 612 is calculated based on fields of the field 604 (Telemetry Header). Some embodiments include a configurable 32 bit initial value which is taken as input apart from fields of the telemetry header 604. When used as a checksum, the checksum prevents any scenario of false match happening (i.e to avoid a node from misinterpreting the message as telemetry message if the checksum does not match). The node processing the telemetry message checks the checksum. Only if the checksum passes, the message is processed as a telemetry message.

In some embodiments, if the packet is carrying any IFA2.0 shim to indicate recording of metadata on nodes, the newly defined re-purposed telemetry header field 604 includes field 708 ("PP_PC_TYPE") that can indicate the presence of IFA2.0 shim after the UDP/TCP header, thereby making sure that the 5 tuple used in hashing at nodes remains the same for packets with a IFA2.0 shim and without a IFA2.0 shim. As an example, Packet without IFA2.0/PBT shim:
L2_HDR→IPv6_HDR→UDP/TCP→Payload Here IPv6_HDR.Next_Protocol has UDP/TCP protocol as a value.

Packet with IFA2.0/PBT shim using proposed Telemetry Header: L2_HDR→IPv6_HDR→Frag_Ext_Hdr (Atomic Fragment)→UDP/TCP→IFA2.0/PBT-Shim→Metadata→Payload The field 602 (e.g., IPv6_HDR.NEXT_HEADER) indicates a fragmentation header but the fragment offset is 0 and M flag is 0 so it is treated as an atomic fragmented packet and the node uses the next header of this fragmentation header along with UDP/TCP port numbers as 5 tuple for hash calculation, which will be the same as a packet without a fragmentation header, according to some embodiments.

In some embodiments, the presence of IFA2.0/PBT-shim protocol is indicated via fields 708 and 610 (e.g., "PP_PC_TYPE" and "Flags" field) in repurposed fragmentation header 600, hence the 5 tuple value for hash calculation is not changed. So if this packet traverses a node which does not understand the telemetry header in IPv6 of this approach, the node can still continue to hash and forward the packet seamlessly because of the presence of the atomic fragment header. Since with the presence of the atomic fragmentation header, the transit node hash based on 5 tuple as packet is without fragmentation header, even if this packet traverses through the node which does not recognize the re-purposed telemetry header. Hence, the packet does not have any adverse impact to packet flow.

In some embodiments, there is no need to use traffic class bits of the IPv6 header to indicate PC marking. The fields 708 and 610 of the re-purposed fragmentation header 600 indicate a PC marked copy. Any node which is not aware of the re-purposed telemetry header ignores this field and hence, intentionally unmarking of the PC indication is prevented. Since this field is overlaid on reserved flags and an identification field which no nodes modify, the unwanted unmarking is avoided in some embodiments.

In some embodiments, using atomic fragmentation concept (where field 606 (frag offset) is 0 and field 610 (MF flag) is 0 and field 608 (Reserved flag) is non-zero) prevents a possible false match because the suggested reserved bits should be 0. In some embodiments, where a reserved flag is used for a specific purpose (e.g., as an additional check), the user can use a 32 bit checksum overlaid on identification field 612 of IPv6 header as shown in FIG. 6.

In some embodiments during probe telemetry initiation, the node can decide to enable PP based telemetry for certain flow based on its local configuration. The node checks that the incoming IPv6 packet does not have a fragment extension header and through sampling and clone techniques, the node clones 1 out of N packets for PP-based telemetry using newly defined fields to mark the packet for PP tracking. The node truncates the cloned packet to 256 or 512 bytes depending upon configuration so that these cloned packets are not subjected to fragmentation in nodes downstream in some embodiments.

Once cloned and truncated, the node performs the following update in some embodiments:

a) Insert Fragment extension header after IPv6 header and before L4 header (TCP/UDP)

b) Set IPv6 Next Header to point to fragmentation header 600.

c) Set next header field 602 of fragmentation header 600 to point to original incoming IPv6 next header field.

d) Set Ver field 702 of Telemetry Header (field 604) as 1 e) Set C bit in field 704 to indicate Checksum present in place of identification field 612.

f) Set M flag field 610 as 0 and fragment offset field 606 as 0 to indicate atomic fragment.

g) Set PC_PP_TYPE field 708 to desired value to indicate type of PP shim present after L4 (TCP/UDP) header. The type of shim can be IFA2.0 or any other shim.

h) Calculate checksum on all fields of telemetry header (field 604) and update the identification field 604 with that value. Use checksum algorithm same as used for IPv4 header checksum.

Example Incoming packet:
L2→IPv6→UDP→Payload

Example Outgoing packet:
L2→IPv6→Fragment_Hdr→UDP→Payload(truncated)

The Fragment header fields:
Next_Header will point to UDP
Fragment_Offset and M flag will be 0
Reserved field and Identification field will be set as described above.

In some embodiments during probe telemetry transit, the node enabled for PP data recording decodes the newly re-purposed fragmentation header 600 when the IPv6 next header indicates the presence of fragmentation header 600 with M bit field 610 as 0 and fragment offset field 606 as 0. Before triggering any metadata collection, the node decodes if the reserved bits encoding is as per telemetry header (field 604) (e.g., as shown in FIG. 7). The node validates this with the checksum present on identification field 612 in some embodiments. Only when checksum matches, the node processes the packet as per telemetry header information in some embodiments. If there is a checksum mismatch, the node is configured to ignore all fields in the telemetry header (field 604) and continues processing this packet as a normal IPv6 packet. The transit node does not update any fields of telemetry header (field 604). The node processes 5 tuple (Src_IP, Dst_IP, Next Protocol=L4, L4_SRC_PORT, L4_DST_POR) for hashing purposes in the same way as it does for a packet without an atomic fragment header in some embodiments.

In some embodiments during probe telemetry termination, the node enabled for terminating the PC processes all checks as listed in transit flow. Once the packet passes through these checks, the terminating node records the node metadata and sends this packet to a collector. Since this is probe packet, this packet should be not forwarded to a downstream node. In some embodiments during in band telemetry detection, although the RFC 6864 document prohibits usage of the identification field for non-fragmentation purposes, this approach can be utilized since the fragment header is inserted by the node which is doing telemetry initiation and the fragmentation header is terminated by the node doing telemetry termination. The restriction of the RFC 6864 document does not apply here since the destination never sees this fragmentation header 600 according to some embodiments.

In some embodiments during in band telemetry initiation (e.g., in IFA2.0 In band Telemetry), the node can decide to enable IFA2.0 based telemetry for certain flow based on local configuration. The node checks that the incoming IPv6 packet does not have the fragmentation header and follows similar steps as mentioned above. During in band telemetry transit, the node follows similar steps as discussed above in some embodiments. In some embodiments, the terminating node performs the following before forwarding the in band packet to a downstream node:

a) Remove all the metadata stack from this packet (if any) along with shim header.
 b) Remove the Atomic Fragmentation header from the packet.
 c) Update IPv6 length and forward the packet.

Data centers use instrumentation/telemetry features and include analyzers in some embodiments. The analyzers receive the PP or PC telemetry data according to some applications. In some embodiments, unified packet recirculation can be used effectively to generate and reinsert back the extra copy with any number of metadata bytes and custom headers for instrumentation/telemetry applications. In some embodiments, network device 10 may include Ethernet port interface controllers, gigabit port interface controllers, internet port interface controllers, and additional buffers.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in port or destination quantity, data types, methods of reinsertion, reintroduction, etc., values of parameters, arrangements, etc.). For example, the position of elements may be reversed or otherwise varied, the connections between elements may be direct or indirect, such that there may be one or more intermediate elements connected in between, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure. For example, the embodiments of the present disclosure may be implemented by a single device and/or system, or implemented by a combination of separate devices and/or systems.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer (i.e., ASICs or FPGAs) or any other machine with a processor. Combinations of the above are also included within the scope of machine-readable media. Machine-executable instructions include, for example, instructions and data which cause a general purpose computer, special purpose computer, or special purpose processing machine to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

What is claimed is:

1. A network device, comprising:
 at least one port; and
 a processor configured to provide telemetry using a postcard approach and/or a passport approach, wherein the processor provides postcard type setting or passport type setting to indicate the postcard approach or the passport approach in a field used for fragmentation.

2. The network device of claim 1, wherein the processor operates according to an Internet Protocol (IP)v4 communication scheme or IPV6 communication scheme.

3. The network device of claim 1, wherein the field is a fragmentation offset field.

4. The network device of claim 1, wherein the field is in a fragmentation header.

5. The network device of claim 4, wherein the field is a reserve field.

6. The network device of claim 1, wherein the telemetry is probe telemetry or in-band telemetry.

7. The network device of claim 1, wherein a telemetry extension header information is provided in an identification field.

8. The network device of claim 1, wherein the field comprises a fragmentation offset field and a no fragmentation bit is set in a flag field.

9. A method of performing telemetry in a network for communicating a packet, the method comprising:
 obtaining a packet header; and
 repurposing at least one field in the packet header to indicate the telemetry is to be performed on the packet, the telemetry being defined by telemetry information in a field or a header used for fragmentation information prior to repurposing, wherein a postcard type setting or passport type setting for the telemetry is provided in the field or header used for the fragmentation information to indicate a postcard approach or a passport approach for the telemetry.

10. The method of claim 9, wherein the packet header is an Internet Protocol (IP)v4 header or IPv6 header.

11. The method of claim 9, wherein the field comprises a fragmentation offset field.

12. The method of claim 9, wherein repurposing comprises providing a nonzero value in a fragmentation offset field and setting a flag to indicate do not fragment.

13. The method of claim 9, wherein the field is a reserve field in a fragmentation header.

14. The method of claim 9, wherein the at least one field comprises passport type information or postcard type information.

15. The method of claim 14, wherein the passport type or postcard type information indicates the presence of In Flow Analyzer (IFA2.0) shim after a User Datagram Protocol/Transmission Control Protocol (UDP/TCP) header.

16. A processor for use in a network for communicating a packet, the processor being configured to obtain a packet header for the packet and perform telemetry using a postcard approach and/or a passport approach by using a repurposed field in the packet header to indicate the telemetry is to be performed on the packet, wherein a postcard type setting or passport type setting for the telemetry is provided in a field used for fragmentation to indicate the postcard approach or the passport approach.

17. The processor of claim 16, wherein the telemetry is performed if a flag field in an Internet Protocol (IP) header that indicates the packet is not subject to fragmentation.

18. The processor of claim 17, wherein the repurposed field comprises a fragment offset field in the IP header.

19. The processor of claim 17, wherein the repurposed field is a reserve field in a fragmentation header.

20. The processor of claim 17, wherein the repurposed field is a reserve field in an Internet Protocol (IP) version 6 (IPv6) fragmentation header.

* * * * *